Dec. 16, 1952     E. L. LUACES ET AL     2,621,528

V BELT HAVING METALLIC NEUTRAL AXIS

Original Filed March 8, 1943

INVENTORS
ENRIQUE L. LUACES
MELVIN A. CROSBY.
BY
Toulmin & Toulmin
ATTORNEYS

Patented Dec. 16, 1952

2,621,528

UNITED STATES PATENT OFFICE 2,621,528

V-BELT HAVING METALLIC NEUTRAL AXIS

Enrique L. Luaces and Melvin A. Crosby, Dayton, Ohio, assignors to The Dayton Rubber Company, a corporation of Ohio Original application March 8, 1943, Serial No. 478,430, now Patent No. 2,430,024, dated November 4, 1947. Divided and this application August 13, 1946, Serial No. 690,178

1 Claim. (Cl. 74—233)

This invention relates to V-belts, and more particularly deals with a V-belt having a metallic neutral axis section of such design that it lends itself well to the formation of a strong and lasting bond between the rubber composition of which the belt body is made and the metallic neutral axis member.

This application is a division of our copending application Serial Number 478,430, filed March 8, 1943, now Patent No. 2,430,024 issued November 4, 1947.

Hitherto V-belts have been designed with a neutral axis section comprising a plurality of substantially inextensible cords made of cotton or similar textile material. More recently it has been suggested that V-belts be constructed with a metallic neutral axis section in order to reduce to a minimum the stretch which results in the course of the service life of a belt and in order to increase such service life.

The ideal V-belt structure might be said to include a neutral axis section comprising an endless band of flexible metal; however, such a belt structure is unobtainable with a satisfactory life and performance because the adhesive bond between the rubber composition of which the belt is made and the metal of the neutral axis is insecure. Such a belt structure, if it were possible of obtainment, would be characterized by substantial longitudinal inextensibility and lateral incompressibility, and these are perhaps two of the most important qualities of a V-belt because they define and determine the efficiency and service life.

The primary purpose of the present invention is to produce a belt structure having insofar as possible the desired advantageous characteristics of longitudinal inextensibility and lateral incompressibility and, in addition, a substantially permanent strong bond between the rubber composition of which the belt is made and the metallic neutral axis member which forms a part thereof.

The nature of the present invention will be more clearly understood from the following description taken in connection with the annexed drawings in which.

Figure 1:
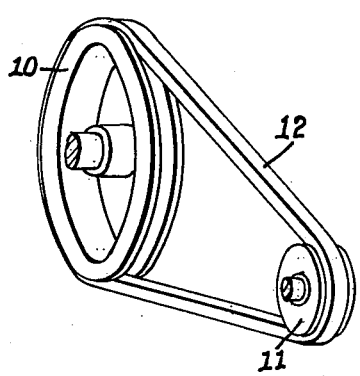
Fig. 1 is a perspective view of a typical single belt V-drive.
Figure 2:
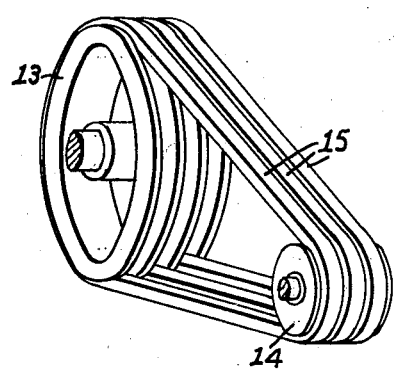
Fig. 2 is a perspective view of a typical multi-belt V-drive.

Referring now to the drawings in detail, and in particular to Fig. 1, the numerals 10 and 11 represent pulleys driven conjointly through the means of a V-belt 12. In Figure 2, 13 and 14 represent pulleys driven conjointly through the means of a plurality of V-belts 15.

Figure 4:
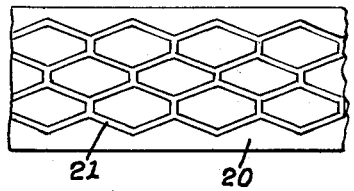
Fig. 4 is a plan view of the neutral axis zone.
Figure 3:
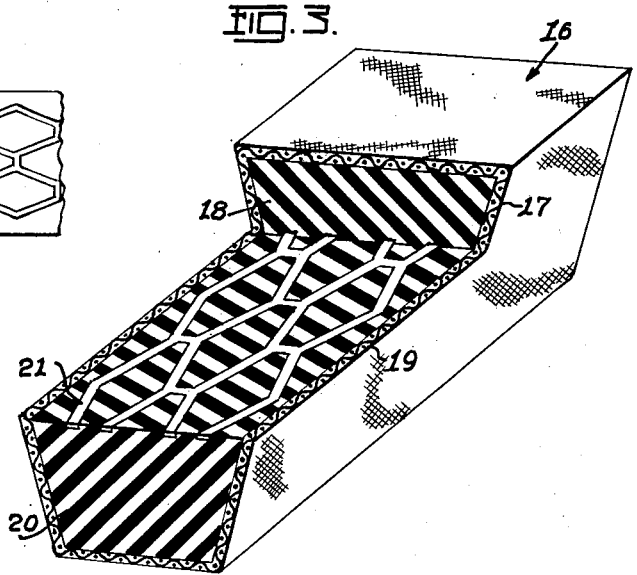
Fig. 3 is a perspective view, partly in cross-section, of a belt of the wrapped type provided with a metallic neutral axis member.

In Fig. 3 the numeral 16 is a wrapped belt comprising a wrapper 17, a tension section 18, a metallic neutral axis section 19, and a compression section 20. The neutral axis section comprises a member of expanded metal 21. This band of expanded metal is of somewhat smaller width than the belt and thus spaced away from the sides of the belt. Figure 4 shows a plan view of the expanded metal member 21 applied to the compression zone 20. As shown in Figs. 3 and 4 of the drawings, the metal band is flat with the apertures expanded in the plane of the band as is conventional in the manufacture of expanded metal products.

Figure 5:
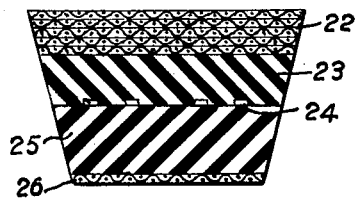
Fig. 5 is a cross-sectional view of a raw edge belt having a metallic neutral axis member substantially like that shown in Fig. 3.

In Fig. 5 the numeral 22 represents a plurality of layers of rubberized fabric forming the top layer of a raw edge belt, 23 is the tension section of rubber composition, 24 is the metallic neutral axis section, 25 is the compression section, and 26 is a layer of rubberized fabric lying along the inner surface of the belt.

The belts of the present invention have as an outstanding characteristic a strong adhesive bond between the rubber composition forming the tension and compression sections of the belt and the metallic member which forms the neutral axis section. Because of the stability and the rigidity of the metallic neutral axis section, it is not generally necessary to include in the belt of the present invention any reinforcing material such as fine textile fibers, but the use of such fiber reinforced rubber composition is not precluded.

The strong adhesive bond which exists between the metallic neutral axis member and the rubber composition of the tension and compression sections of the belts of the present invention is primarily mechanical in character. During the vulcanizing or curing of the belt of the present invention under the influence of heat and pressure, the rubber composition of the compression section and the rubber composition of the tension section are caused to flow through the openings between the expanded member forming the neutral axis section. The material flowing together commingles and becomes, in effect, a coherent single mass or body thereby anchoring permanently and securely the metallic neutral axis member within the rubber body of the belt.

The metallic neutral axis member may also be treated electrochemically or electrolytically for the purpose of conditioning its surface and increasing the adhesive bond between the metal and the rubber composition of which the belt body is made. However, this step is not a part of the present invention and is more fully disclosed and claimed in Patent No. 2,382,081 granted August 14, 1945.

The present invention has been described and illustrated as used in connection with raw edge belts and wrapped belts of the non-cog type, but it will be understood that the same principles of construction and the same advantages may be obtained in the case of belts having cogs either on their inner or outer surfaces or on both of these surfaces.

While the invention which is the subject matter of this application has been described in connection with certain embodiments thereof, it is not intended thereby to have this invention limited to or circumscribed by the specific details of construction, arrangement of parts, or materials herein described or illustrated in the annexed drawings in view of the fact that the invention is susceptible to modifications depending on individual preference and conditions without departing from the spirit of this disclosure and the scope of the appended claim.

We claim:

A V-belt having a tension section of rubber composition, a neutral axis section comprising a longitudinal metal reinforcing member consisting of a flat flexible expanded metal band having apertures expanded therethrough along the plane of the band, and a compression section of rubber composition, said tension section and said compression section being united through the apertures in said neutral axis section to form a coherent unitary body, and said metal band being spaced from the side walls of said belt.

E. L. LUACES.
MELVIN A. CROSBY.

REFERENCES CITED

The following references are of record in the file of this patent:

UNITED STATES PATENTS

| Number | Name | Date |
|---|---|---|
| 398,429 | Midgley | Feb. 26, 1889 |
| 1,103,034 | Clark | July 14, 1914 |
| 1,527,912 | Paul | Feb. 24, 1925 |
| 2,018,085 | Otte | Oct. 22, 1935 |
| 2,167,384 | Freedlander | July 25, 1939 |
| 2,179,691 | Freedlander | Nov. 14, 1939 |
| 2,300,706 | Schott | Nov. 3, 1942 |
| 2,326,719 | Myers | Aug. 10, 1943 |
| 2,414,822 | Lindsay et al. | Jan. 28, 1947 |

FOREIGN PATENTS

| Number | Country | Date |
|---|---|---|
| 28,229 | Great Britain | Mar. 26, 1914 |
| 512,501 | Germany | Nov. 12, 1930 |
| 425,089 | Great Britain | Mar. 6, 1935 |